United States Patent [19]

Nelson

[11] 3,866,935
[45] Feb. 18, 1975

[54] SUSPENSION FOR UTILITY TRAILER
[76] Inventor: Charles C. Nelson, 1036 A Del Mar Ave., Richardson, Tex. 93109
[22] Filed: Jan. 30, 1973
[21] Appl. No.: 327,940

[52] U.S. Cl............................. 280/43.23, 214/505
[51] Int. Cl................................................ B60p 1/18
[58] Field of Search.......... 280/43.23, 106.5, 124 F; 180/22 D, 22 E, 24.02; 214/505, 506

[56] References Cited
UNITED STATES PATENTS

| | | | |
|---|---|---|---|
| 2,621,942 | 12/1952 | Getz | 280/414 R X |
| 2,788,908 | 4/1957 | Lynd | 280/414 R X |
| 2,902,288 | 9/1959 | Dill | 280/43.23 |
| 2,918,298 | 12/1959 | Starr | 280/43.23 |
| 3,104,119 | 9/1963 | Long et al. | 280/124 F |
| 3,603,611 | 9/1971 | Wenham | 280/124 F |
| 3,635,492 | 1/1972 | Mauldin | 214/506 X |

Primary Examiner—David Schonberg
Assistant Examiner—Randall Schrecengost
Attorney, Agent, or Firm—Peter J. Murphy; Cecil L. Wood

[57] ABSTRACT

The running gear for a towed trailer includes a single wheel on each side of the trailer, mounted on a bell crank pivotally supported on the trailer frame. The wheel is rotatably supported at one end of the bell crank remote from its pivot, and the other end of the crank is coupled to the frame by means of an extensible fluid motor which functions to rotate the crank and thereby raise and lower the wheels relative to the frame, or, conversely, raise and lower the trailer frame relative to the wheels and the ground. The extensible fluid motor may take the form of an air lift-hydraulic shock absorber with an air cushion chamber, an extensible air motor with an air cushion chamber, or an extensible hydraulic motor with an associated air cushion chamber. The extensible fluid motor and the associated air cushion chamber functions as an air spring suspension for the trailer running gear.

11 Claims, 14 Drawing Figures

SUSPENSION FOR UTILITY TRAILER

BACKGROUND AND SUMMARY OF THE INVENTION

This invention relates to a utility trailer having means for lowering and raising the trailer bed to facilitate loading and unloading; and more particularly to a suspension system for effecting the raising and lowering of the trailer bed, and for cushioning the ride of the trailer frame relative to the running gear.

An object of this invention is to provide a frame and suspension system for a utility trailer, adapted to be towed by any type of vehicle, having means for lowering the trailer toward the ground to facilitate loading and unloading.

Another object of this invention is to provide such a utility trailer having self-contained system and controls for effecting the lowering and raising of the trailer frame relative to its wheels.

Still another object of this invention is to provide a suspension system for a trailer which functions to effect the lowering and raising of the trailer relative to the ground, and which also functions as a spring cushioning means between the trailer frame and the support wheels.

A still further object of this invention is to provide a suspension for a utility trailer which is adjustable to accommodate changing loads carried by the trailer.

These objects are accomplished in a trailer comprising a frame having means at its front end for coupling to a towing vehicle. The suspension means for the frame comprises a ground engaging wheel mounted at each side of the frame intermediate its ends, with the mounting means for each wheel comprising a crank arm mounted to oscillate about a transverse axis. The crank arm carries means for rotatably supporting the crank arm on the trailer frame and defining the transverse axis, a wheel spindle, and an operating pivot. The crank arm defines first arm means carrying the rotatable support means and the wheel spindle, and second arm means carrying the rotatable support means and the operating pivot. An extensible fluid motor having a chamber is mounted between the frame and the crank arm operating pivot, with the fluid motor being operable in extended condition to position the crank arm and wheel to support the frame in elevated transport condition relative to the ground, and operable in retracted condition to lower the frame relative to the ground engaging wheels. The extensible fluid motor chamber includes a cushioning air chamber which defines an air spring coupling between the frame and crank arm, and therefore an air spring suspension for the trailer frame. Control means for the extensible fluid motor is mounted on the frame and includes a reservoir for operating fluid for the motors, conduit means communicating the reservoir with the fluid motors, and flow control means associated with the reservoir and the conduit for directing fluid under pressure to the fluid motors to extend the motors, and for releasing fluid from the motors to effect retraction of the motors.

The novel features and the advantages of the invention, as well as additional objects thereof, will be understood more fully from the following description when read in connection with the accompanying drawings.

DESCRIPTION OF THE PREFERRED EMBODIMENTS

Referring particularly to FIGS. 1 through 5 of the drawings, the trailer frame defines means for supporting a rectangular flat bed with a forwardly extending tongue. The frame, preferably constructed of structural steel members, includes a central longitudinal beam assembly, consisting of a 3 × 3 inch tube for example, which defines the trailer tongue and extends from the forward end to about the midpoint of the trailer bed, with two 2 × 2 inch angles 11 welded to the rearward end of the tube 10 and extending to the rearward end of the frame. Transverse frame members include a forward 3 × 2 inch tube 12 and a mid 3 × 2 inch tube 13 which are welded for example to the longitudinal tube 10.

The side frame members are 3 × 2 inch tubes 14 and 15 welded to the ends of the front and mid-tubes 12 and 13. Two 3 × 2 inch tubes 16 define angle braces extending between the forward ends of the side tubes and the forwardly extending center tube 10 defining the trailer tongue. All of these members are welded together in a generally common plane. A conventional trailer hitch member 17 is secured to the front end of the tongue 10.

Figures 3, 4, 5, 6, 7:
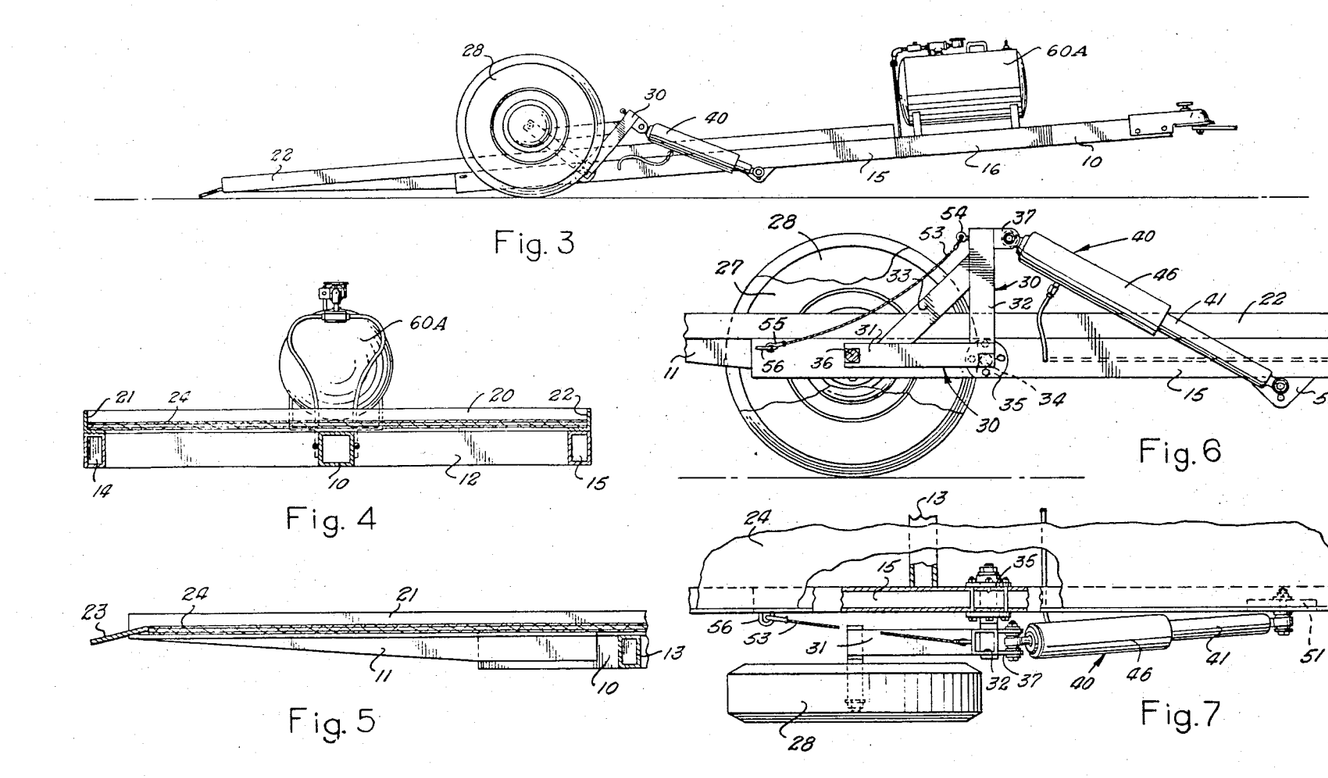
FIG. 3 is a side elevation view of the trailer in FIG. 1 supported in lowered or loading condition.
FIG. 4 is a transverse section view of the trailer frame taken in the plane 4—4 of FIG. 1.
FIG. 5 is a fragmentary detail view of the trailer frame.
FIG. 6 is a fragmentary side elevation view of the trailer suspension mechanism.
FIG. 7 is a fragmentary plan view of the suspension mechanism illustrated in FIG. 6.

The trailer frame further includes bed supporting and confining rails in the form of a forward 2 × 2 inch angle 20 overlying the front tube 12, and side 2 × 2 inch angles 21 and 22 overlying the side tubes 14 and 15, respectively, but extending rearwardly beyond the side tubes to be coextensive with the center angles 11. A rear plate 23 in the form of a transverse steel plate for example is welded to the rear ends of the side rails and of the center angles 11 to define a confining member for the bed floor. The above described rails, frame and end plate define a planar frame support for the bed floor 24, which may be fabricated from plywood or other suitable material for example, and which is confined between the upright flanges of the front and side rails and the end plate 23. FIG. 5 illustrates the relationship of the rear plate 23 which may be a ⅜ × 6 inch plate for example and the bed floor 24 which may be a ¾ or 1 inch plywood floor for example.

In the illustrated form of the trailer, the trailer frame is supported by a single pair of ground engaging wheels 27 and 28, one wheel being independently supported at each side of the trailer frame about the midpoint. The suspension systems at each side of the trailer are identical; and one system will be described with particular reference to FIGS. 6, 7 and 8. As best seen in FIG. 6, the right wheel 28 is carried on a crank arm 30 which is in the form of a bell crank having a lateral arm 31 and an upright arm 32 connected by an angle brace 33, the crank arm being fabricated of 2 × 2 inch steel tubing for example. In the drawings the lateral and upright arms are illustrated as being arranged at right angles, with the crank arm having a support spindle shaft 34 extending transversely from the crank arm at the apex of the two arms. The spindle shaft 34 is rotatable supported in a suitable bearing assembly 35, preferably consisting of two axially spaced roller bearing units, with the assembly being supported within the side frame tube 15.

A wheel spindle 36 is secured to the free end of the lateral arm 31 projecting transversely outward from the trailer frame, and supports the bearing assembly for the wheel in a conventional manner. A pair of ears 37 having transversely aligned holes are mounted at the free end of the upright arm 32 and define an operating pivot for the crank arm.

Figure 8:
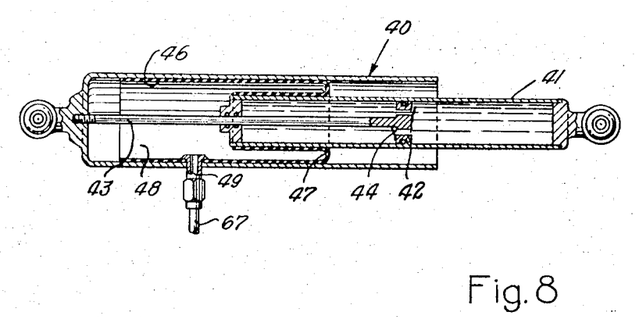
FIG. 8 is a diagrammatical sectional view of an air lift-hydraulic shock absorber unit, which serves as the suspension motors in the trailer of FIG. 1.

Suspension motors 40 are provided for positioning the crank arms 30 in the selected positions; and one preferred form of suspension motor is an air lift-hydraulic shock absorber unit, referred to as an "air shock," and which is diagrammatically illustrated in FIG. 8. Referring to FIG. 8 this air shock 40 includes a lower case 41 defining a closed cylinder containing hydraulic fluid, and further containing a piston 42 and an attached piston rod 43 which projects from a sealed opening at the upper end of the lower case. The piston has transverse passages of preselected cross-section each of which is controlled by a one way check valve 44, these passages and check valves controlling the rate of movement of the piston through the fluid filled lower case in both directions. The air shock includes a cup-shaped cylindrical upper case 46 which telescopes over the lower case and is connected to the free end of the piston rod 43. The upper case is connected in sealed relation to the lower case by means of a flexible rubber diaphragm or boot 47 for example so that a closed air chamber 48 is defined by the upper case, the boot and the adjacent end of the lower case, the lower case functioning then as a piston movable longitudinally within the upper case. A nipple 49 is provided for communicating the air chamber with a supply air through a suitable conduit. A lug fixed to the free end of the lower case 41 is provided for anchoring the air shock 40 to the trailer frame; and similarly a lug is fixed to the upper end of the upper case for securing the upper end of the air shock to the operating pivot 37 as seen in FIGS. 6 and 7.

Referring to FIG. 6, to provide for some adjustment in attaching the air shock 40, a lug 51 is secured to the lower edge of the side tube 15 and is provided with vertically spaced holes for changing the mounting position of the lower case 41.

Figure 1:
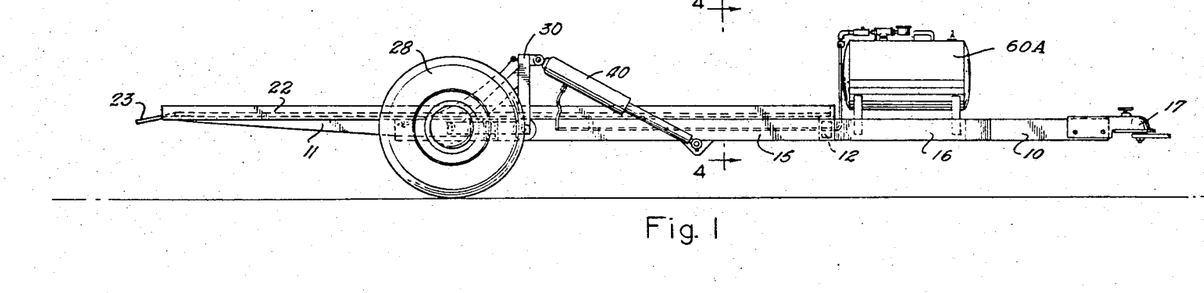
FIG. 1 is a side elevation view of a trailer according to the invention supported in raised or transport condition.

In FIGS. 6 and 7 and in FIG. 1 the air shock unit is shown in extended condition to position the crank arm in the illustrated position wherein the trailer bed is supported generally level with the ground, i.e. the "transport condition." In order to lower the trailer bed, air is released from the air chamber 48, through controls to be described, permitting the crank arm to rotate clockwise as viewed in FIG. 6 under the weight of the trailer and/or its load and to effect collapse of the air shock unit. With a suitable control system, the rear end of the trailer will be lowered to a point where the rear plate 23 rests on the ground permitting articles to be actually rolled onto or off of the trailer bed. This is the "load condition" of the trailer.

In FIGS. 6 and 7 there is shown a simple form of safety device for preventing the lowering of the trailer bed to the ground in the event of air leakage or failure of the suspension motors. This safety device is shown in the form of a plastic coated cable 53 secured at one end to an eyelet 54 which is mounted at the upper end of the crank upright arm 32, and having a snap hook 55 at its other end adapted to be latched to an eyelet 56 on the trailer frame. In the transport condition of the crank arm illustrated in FIG. 6, the cable will be quite slack to allow for oscillation of the arm during the normal cushioning function. The cable is arranged however so that after a predetermined rotation of the arm in a clockwise direction, the cable will become taut and prevent further rotation. It would be desirable for example for a trailer having overall length of 11 or 12 feet including tongue to maintain the trailer about 8 inches above the ground.

Figure 9:
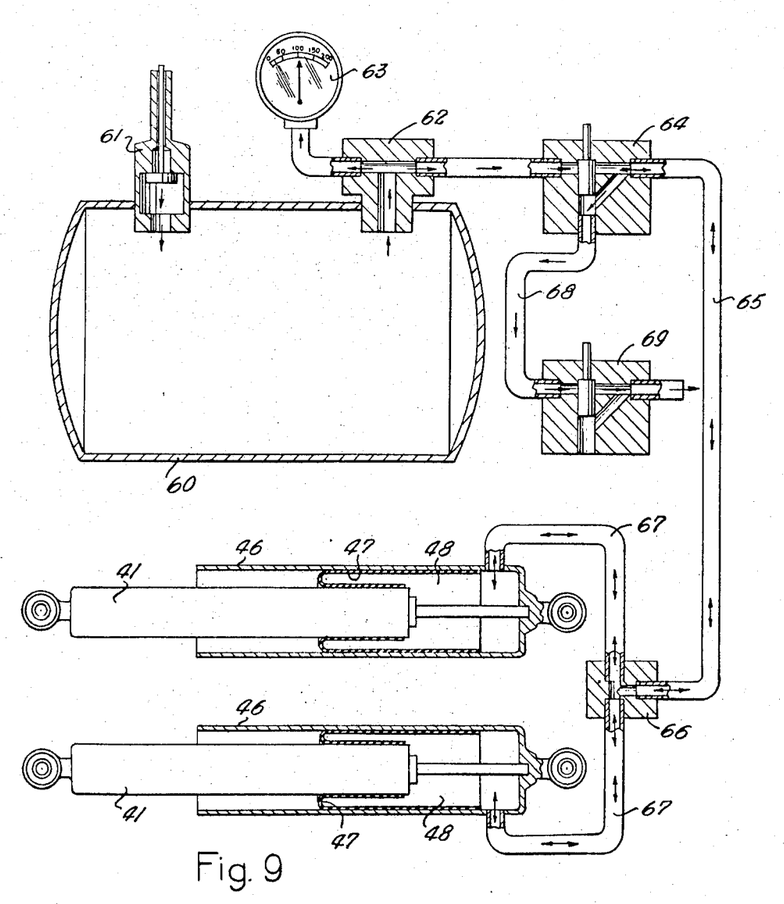
FIG. 9 is a diagrammatic illustration of the pneumatic control system for the trailer of FIG. 1.

FIG. 9 is a diagrammatic illustration of a pneumatic system for operating the above described suspension system. This system includes a reservoir 60 for pressurized air and having mounted thereon a conventional fill valve 61 and a tee fitting 62 for communicating the reservoir chamber with a pressure gauge 63 and a supply valve 64. The supply valve 64 is communicated through a conduit 65 with a second tee fitting 66 and through parallel conduits 67 to the two air chambers 48 of the respective air shocks 40. The supply valve 64 is preferably a normally closed push-button valve which functions as a throttling valve to control the flow of pressurized air from the reservoir to the shock air chambers.

The outlet side of the supply valve 64 is communicated through a conduit 68 with a vent valve 69. The vent valve is also preferably a normally closed push-button valve which functions as a throttling valve to bleed air from the chambers 48 through the conduit 65 for effecting retraction of the air shocks 40 to lower the trailer to load condition.

Figure 2:
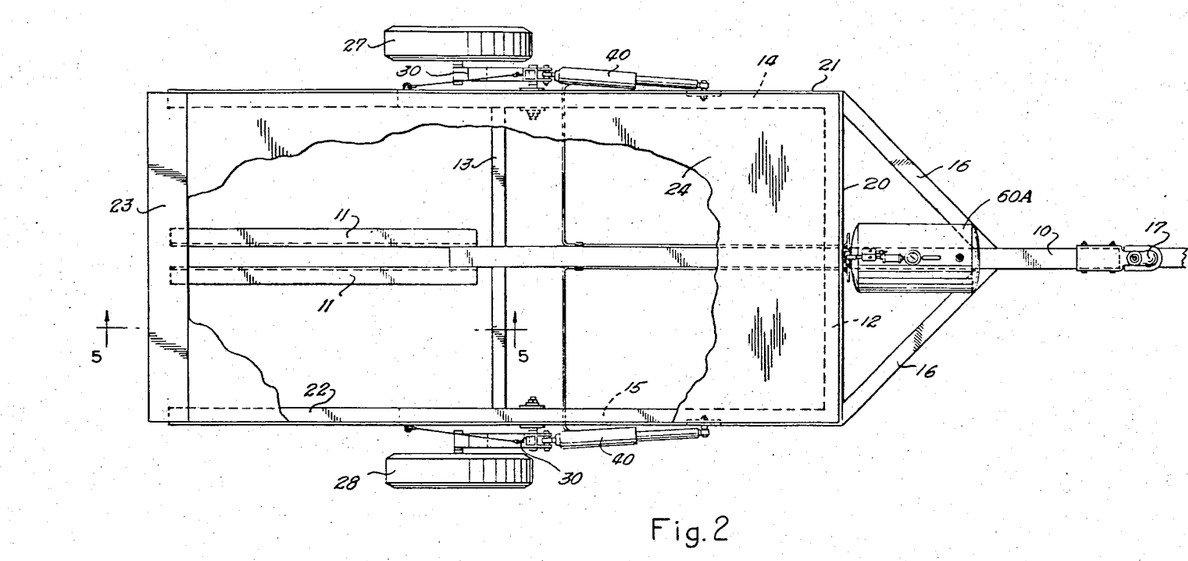
FIG. 2 is a plan view of the trailer of FIG. 1.

Referring particularly to FIGS. 1 and 2 of the drawings, the reservoir 60 is in the form of a cylindrical tank 60A which is mounted at the forward end of the trailer frame on the tongue 10 and angle braces 16, and which carries the above mentioned fill valve 61 and pressure gauge 63. This tank may be conveniently filled at a service station to the desired pressure. The supply valve 64 and vent valve 69 are also conveniently mounted adjacent to the tank for convenient operation of the trailer.

Figures 10, 11, 12:
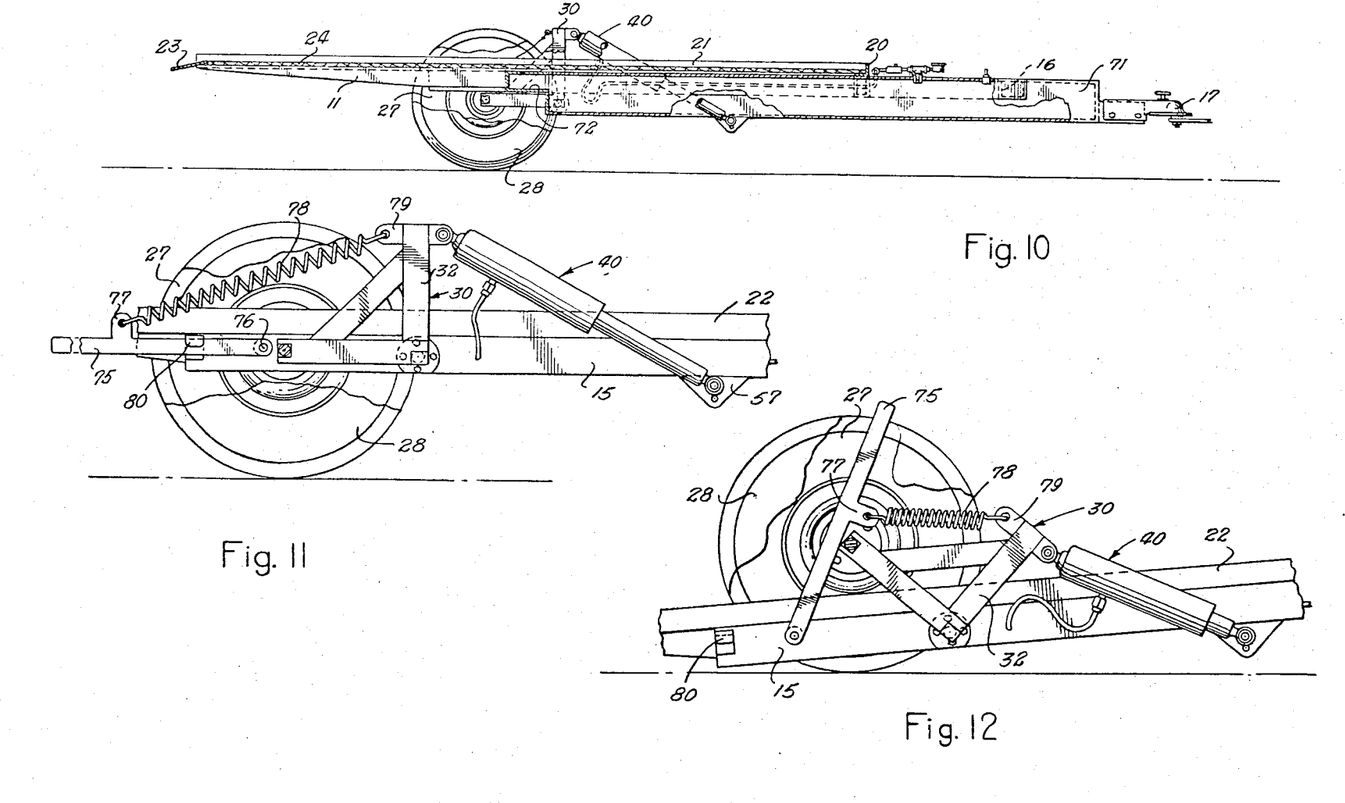
FIG. 10 is a side elevation view of a modified form of trailer frame wherein a portion of the frame serves as an air reservoir.
FIGS. 11 and 12 are diagrammatic views of the air lift-shock absorber suspension motor with an adjustable booster spring.

FIG. 10 of the drawing illustrates an alternative trailer frame construction wherein the air reservoir 60 is incorporated within the frame rather than in a separate pressure vessel. In this configuration the tongue and central beam member 71 is similar to the beam 10 previously described except that it is larger cross-section, for example a 3 × 6 inch tube. Similarly the mid-tube 72 is generally similar in construction to the mid-tube 13 except that it is larger cross-section such as a 3 × 6 inch tube disposed as shown in FIG. 10, with the mid-tube 72 and the center tube 71 being interconnected to define a pressure vessel having sufficient capacity for raising and lowering the trailer bed a number of times. In this configuration the fill valve 61, gauge 63 and the supply and vent valve may be conveniently mounted on the tongue 71 at the front end of the frame.

The operation of the above described trailer will be apparent from the foregoing description but will be briefly summarized. The air reservoir, such as the tank 60A will have the capacity for sufficient air at desired pressure to lift and support the load for which the trailer is designed and to enable the trailer to be raised a desired number of times without the necessity for refilling the reservoir. When it is desired to lower the trailer bed from the transport condition to the load condition, the vent valve is actuated to bleed sufficient air from the air shock chambers 48 to lower the trailer. When the trailer is loaded, the supply valve is opened to supply sufficient air from the reservoir to the air shock chambers to raise the trailer to transport condition.

FIGS. 11 and 12 of the drawing are diagrammatic illustrations of a lever-adjusted booster spring which may be used with the above described air shock suspension motors to increase the capacity of the trailer. Referring to these figures an elongated lever 75 is pivotally attached at 76 to the trailer frame and has an eyelet 77 spaced from the pivot 76. A tension spring 78 is connected between the lever eyelet 77 and an eleyet 79 at the upper end of the crank upright arm 32.

In FIG. 11 the lever 75 is retained in the horizontal position by means of a latch 80; and in this position the spring 78 is tensioned sufficiently to assist the air shock 40 in supporting the trailer load. When it is desired to lower the trailer bed, the lever 75 is disengaged from the latch 80 and raised to the vertical position thus releasing the tension of the spring 78 and permitting the crank 30 to rotate to the position indicated in FIG. 12 allowing lowering of the trailer. Obviously any tension maintained in the spring in this condition must provide a lesser force than that required to support the unloaded weight of the trailer. By this means a booster spring is provided for increasing the trailer capacity but which is readily adjusted or released to permit the desired lowering of the trailer to the load condition.

It will be apparent that a booster spring which is not lever-controlled could be provided being attached directly to the frame rather than through the lever 75. This spring would be less effective to increase the trailer capacity since in its extended condition it would have to permit the lowering of the unloaded trailer.

Figure 13:
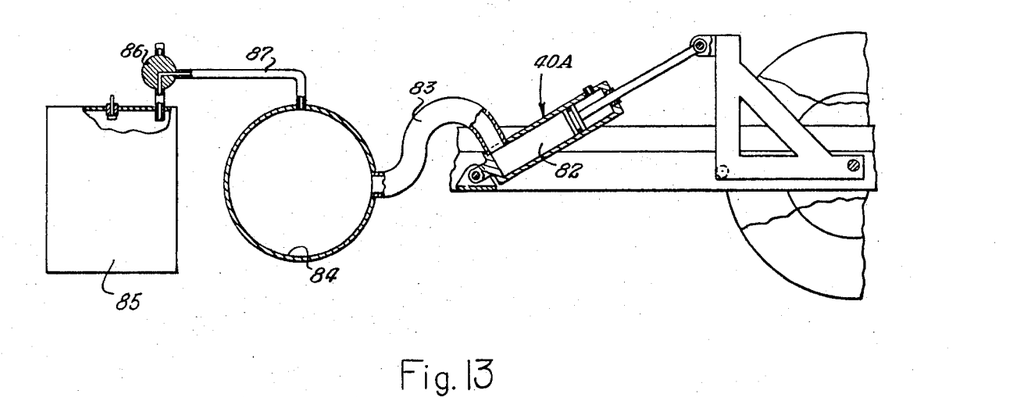
FIG. 13 is a diagrammatic view of an alternative form of suspension system including an air cylinder and auxiliary air cushion chamber.

FIG. 13 of the drawing is a diagrammatic illustration of an alternative suspension system wherein the suspension motor unit 40 for the arm 30 is a single acting air cylinder 40A having an air chamber 82 which expands and contracts during operation of the air motor. The air chamber 82 is communicated, by means of a large capacity conduit 83, with an auxiliary air chamber vessel 84 so that the conduit 83 and vessel chamber 84 effectively define an extension of the motor air chamber 82. Air reservoir 85 is communicated with the vessel 84 through a three-way valve 86 and conduit 87. In this system the three-way valve 86 functions as the supply and vent valve for supplying air from the reservoir to the air cylinder chambers to raise the trailer, and for venting the air cylinders to lower the trailer. In transport condition, the combination chamber 82, 83, and 84 functions as a cushion chamber for cushioning the ride of the trailer. The air reservoir 85, shown diagrammatically, may be defined in whole or in part by a hollow tubular frame member as described with reference to FIG. 10.

Figure 14:
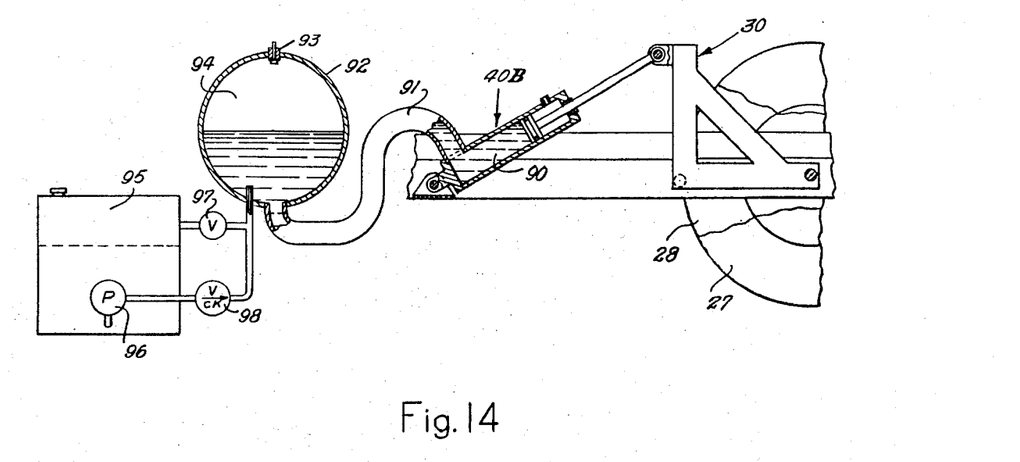
FIG. 14 is a diagrammatic illustration of an alternative form of suspension system for the crank arm including a hydraulic extensible air cylinder motor with an auxiliary air cushion chamber for cushioning the wheel suspension, and associated hydraulic controls.

FIG. 14 of the drawing illustrates another alternative suspension system for the trailer above described wherein the suspension motor unit 40 is a single acting hydraulic cylinder 40B. This hydraulic cylinder includes a fluid chamber 90 communicated by way of a large capacity conduit 91 to an accumulator vessel 92. The accumulator vessel 92 has an air fill valve 93 at its top and is partially filled with air to define an air cushion chamber 94. The vessel is also partially filled with hydraulic fluid so that the accumulator vessel 92, conduit 91 and cylinder motor chamber 90 effectively define a single fluid chamber. Pressurized air in the air chamber 94 acts on the surface of the hydraulic fluid in the accumulator functioning as an air cushion to cushion the ride of the trailer through the suspension system.

With this system the trailer is lowered and raised by means of a conventional hydraulic system including an oil reservoir 95, an oil pump 96 preferably electric motor driven, and associated conduits communicating the reservoir and pump with the accumulator vessel 92. The hydraulic pump then may be operated from a power supply in the towing vehicle or from a battery carried on the trailer. The oil reservoir 95, shown diagrammatically, may be defined in whole or in part by a hollow tubular frame member as described with reference to FIG. 10.

For lowering the trailer, normally closed valve 97 is opened to permit the flow of hydraulic fluid from the accumulator 92 into the reservoir 95 permitting contraction of the cylinders 40B under the load of the trailer. When it is desired to raise the trailer to running condition, the pump 96 is operated to pump fluid from the reservoir through the check valve 98 into the accumulator 92 to extend the cylinders 40B. The air in the air chamber 94 is maintained at a constant pressure to maintain the trailer load and provide the desired cushioning of the trailer ride.

A modification of this system would be to eliminate the oil reservoir and pump and to maintain a constant volume of oil in the chambers defined by the cylinder chambers 90, the conduits 91 and the accumulator 92, and to effect retraction and extension of the hydraulic motor units 40B by venting air from the air chamber 94 and supplying air to this chamber through the control system illustrated diagrammatically in FIG. 9.

What has been described in a suspension system for a utility trailer enabling the lowering of the trailer bed to the ground for easy loading and unloading, providing a cushioned ride for the trailer to provide for stability of the trailer and protection of the load carried by the trailer, and providing for ease of handling by the towing vehicle.

While the trailer is described as having a simple flat bed, it will be apparent that the trailer frame and bed may take other forms, or that the bed may be provided with side walls attached to the front and side rails for example to provide a box trailer.

The trailer has been described as having a single pair of ground engaging wheels, one at each side; however it will be apparent that the described suspension systems could be employed as well with tandem wheels at each side of the trailer. Individual suspension motor units could be provided for each of the tandem wheels; or alternatively, the tandem wheels could be mounted as a unit on a single crank arm control operated by a single suspension motor unit.

While preferred embodiments of the invention have been illustrated and described, it will be understood by those skilled in the art that changes and modifications may be resorted to without departing from the spirit and scope of the invention.

What is claimed is:

1. A trailer comprising
a frame having means at its front end for coupling to a towing vehicle; suspension means comprising a ground engaging wheel mounted at each side of said frame intermediate the ends thereof;
mounting means for each wheel comprising a crank arm mounted to oscillate about a transverse axis, and coacting rotatable support means on said frame and crank arm defining said transverse axis; said crank arm defining first arm means carrying a wheel spindle in spaced relation to said transverse axis, and defining second arm means carrying an operating pivot in spaced relation to said transverse axis;
an extensible fluid motor, having an expansible chamber, mounted between said frame and said crank arm operating pivot, operable in extended condition to position said crank arm and wheel to support said frame in elevated transport condition, and operable in retracted condition to lower said frame relative to said wheel; said motor expansible chamber defining, at least in part, a cushioning air chamber providing an air spring suspension between said frame and said crank arm;
and control means mounted on said frame, for said extensible fluid motors; said control means comprising a reservoir for operating fluid for said extensible fluid motors; conduit means communicating said reservoir with said fluid motors, and flow control means associated with said reservoir and said conduit for directing fluid under pressure to said extensible fluid motors to extend said motors, and for releasing fluid from said motors to effect retraction of said motors.

2. The trailer of claim 1
said extensible fluid motor comprising an air lift-hydraulic shock absorber unit; said cushioning air chamber being defined by the air lift chamber of said air lift-hydraulic shock absorber unit;
said reservoir for operating fluid comprising a reservoir for pressurized air; and said flow control means comprising first valve means for controlling the flow of pressurized air from said reservoir to said extensible motor chamber to effect extension thereof, and second valve means for controlling the flow of air from said extensible motor chamber to effect retraction thereof.

3. The trailer of claim 1
said extensible fluid motor comprising a hydraulic cylinder unit; said cushioning air chamber means comprising an accumulator chamber for hydraulic fluid communicating with said hydraulic motor, and a chamber for pressurized air acting on the hydraulic fluid in said chamber;
said reservoir for operating fluid comprising a reservoir for hydraulic fluid communicating with said accumulator and said extensible fluid motor; said flow control means comprising a pump and check valve for effecting the flow of hydraulic fluid under pressure to said extensible fluid motor, and a valve and conduit means for releasing fluid from said fluid motor to said reservoir.

4. The trailer of claim 1
said extensible fluid motor comprising an air cylinder unit; air chamber means comprising an auxiliary air chamber communicating with the air chamber of said air cylinder unit; said auxiliary air chamber and said air cylinder unit together defining said cushioning air chamber;
said reservoir comprising a pressurized air supply tank communicated with said auxiliary air chamber means by suitable conduits; and said flow control means comprising first valve means for controlling the flow of air from said supply tank to said auxiliary chamber, and second valve means for effecting the discharge of air from said auxiliary chamber and said extensible air cylinder.

5. The trailer of claim 1
said suspension means comprising a single ground engaging wheel mounted on each side of said frame; and each ground engaging wheel being supported independently on said frame by one assembly of said crank arm and said extensible fluid motor.

6. A trailer as set forth in claim 5
said frame having generally parallel side frame members; a bearing member mounted on each of said side frame members, each bearing member defining a transverse axis, with the axes of the two bearing members being aligned; each of said crank arms carrying a relatively short spindle shaft parallel to said wheel spindle, and disposed to be rotatably supported in said bearing member; and said bearing member and said spindle shaft defining said coacting rotatable support means.

7. The trailer of claim 1
said flow control means comprising first and second throttling valves connected in said conduit means; said first valve being a normally closed valve, openable to permit the flow of fluid from said reservoir to said fluid motors; and said second valve means being a normally closed valve positioned in said conduit means between said first valve and said fluid motors and openable to vent fluid from said fluid motors.

8. The trailer of claim 1
a coupling link connected between said crank arm and said frame for limiting rotation of said crank arm in one direction relative to said frame to limit the lowering of said frame relative to said ground engaging wheels; said coupling link permitting limited oscillation of said arm relative to said frame in the transport condition of said trailer; and means for uncoupling said link to permit additional rotation of said arm to lower said frame relative to said wheels.

9. The trailer of claim 2 booster spring means associated with said extensible fluid motor and said crank arm; said booster spring means comprising a tension spring connected between said crank arm and said frame and urging rotation of said arm in a direction to lift said frame relative to said wheel.

10. The trailer of claim 9 an elongated lever having a pivot for pivotally mounting the lever on said frame; means for latching said lever in a predetermined position on said frame;

said lever having coupling means spaced from said pivot for attachment to said tension spring; said lever comprising said means for attaching said spring to said frame;

said lever in said predetermined latched position tensioning said spring to provide maximum spring assist for said air motor; and said lever being swingable from said predetermined latched position to release the tension of said spring, thereby permitting the lowering of said frame relative to said wheel.

11. The trailer of claim 2 said air lift-hydraulic shock absorber unit comprising a first casing defining an elongated closed cylinder chamber; means at one end of said first casing for coupling said unit to said frame; a piston disposed within said casing having an attached piston rod extending from the other end of said casing and including means for coupling said unit to said crank arm;

said first casing and said piston defining two chambers for containing hydraulic fluid; and valved passage means associated with said piston for permitting predetermined flow of fluid past said piston in either direction to control the rate of movement of said piston within said first casing;

a second elongated cup-shaped casing associated with said piston rod and disposed in telescoping relation with said first casing; flexible sealing means between said first and second casing; and said first and second casings and said flexible sealing means providing an expansible air chamber defining said air lift chamber.

* * * * *

UNITED STATES PATENT OFFICE
CERTIFICATE OF CORRECTION

Patent No. 3,866,935          Dated February 18, 1975

Inventor(s) Charles C. Nelson

It is certified that error appears in the above-identified patent and that said Letters Patent are hereby corrected as shown below:

On the Title page in item 76 , "1036 A Del Mar Ave., Richardson, Texas 93109"

should read

-- 1036 A Del Mar Ave., Santa Barbara, California 93109 --

Signed and sealed this 6th day of May 1975.

(SEAL)
Attest:

RUTH C. MASON
Attesting Officer

C. MARSHALL DANN
Commissioner of Patents
and Trademarks